Dec. 26, 1939.                F. C. HUTCHISON                2,184,499
                                WELDING NOZZLE
                              Filed May 25, 1935
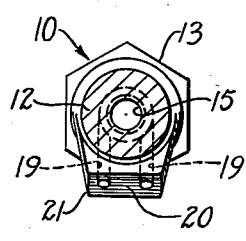
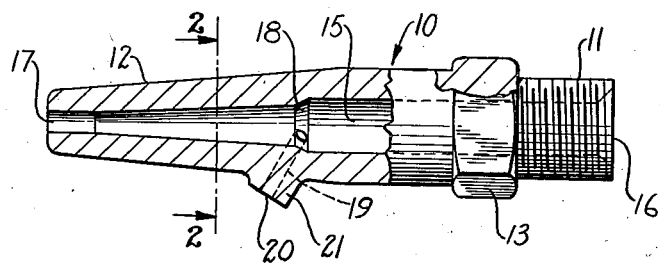
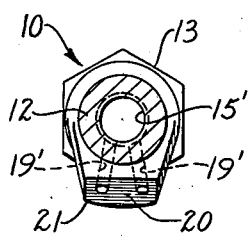
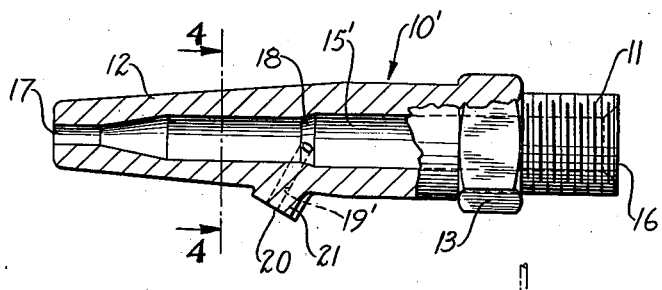
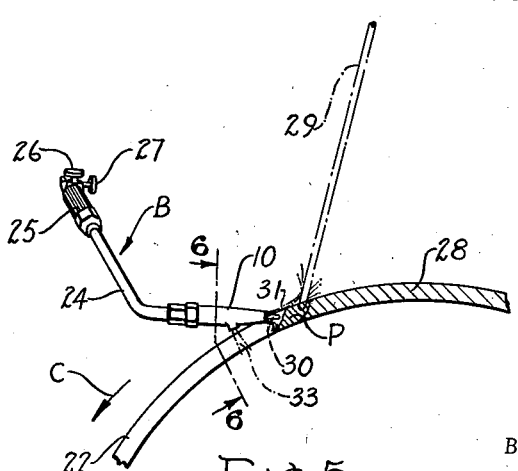
INVENTOR.
FRANK C. HUTCHISON
BY
ATTORNEY.

Patented Dec. 26, 1939

2,184,499

UNITED STATES PATENT OFFICE 2,184,499

WELDING NOZZLE

Frank C. Hutchison, Kansas City, Mo., assignor, by mesne assignments, to Union Carbide and Carbon Corporation, a corporation of New York Application May 25, 1935, Serial No. 23,442

4 Claims. (Cl. 158—27.4)

This invention relates to gas welding in which the welding heat is supplied by a high temperature flame resulting from a mixture of oxygen or oxygen and air and a combustible gas, and more particularly to a blowpipe nozzle or tip through which such a gaseous mixture is forced and at the discharge orifice of which the heating flame is produced and maintained.

In welding manually with a gas, such as a mixture of oxygen and acetylene, it has generally been the practice to employ a blowpipe having a nozzle or tip provided with a single discharge orifice for the high temperature welding flame. The general recommended procedure in making a weld with such a blowpipe is for the welder to hold the blowpipe in one hand and a welding rod in the other hand, the blowpipe being positioned so that the tip of the inner or luminous cone of the resulting flame licks or almost touches the base metal, and the welding rod being positioned so that its lower or melting end rests upon or is in moving contact with the base metal. The welding flame is more or less oscillated over the base metal at regions slightly ahead of and at the weld, the quantity of heat applied at the weld being sufficient to melt the base metal into a puddle. Preferably the rod is melted by heat radiated from the flame and by conduction of heat to the rod from the puddle, and this molten deposited metal increases the size of the puddle and aids materially in regulating and controlling the temperature of the puddle in the presence of the extremely high temperature welding flame.

When a sufficient amount of molten metal has been deposited to form a puddle of appropriate size, both the flame and welding rod are progressively moved along the seam, thereby removing the intense heat of the flame from the stern part of the puddle, as it is produced at successive surface portions, to give it an opportunity to solidify as an integral element of the metallic members being united.

From the foregoing it will be apparent that a welder must manipulate the welding flame to preheat constantly a region of the base metal slightly ahead of the weld puddle so that it can be readily melted by the high temperature luminous cone to receive the advancing deposited metal; to heat the weld puddle to maintain its fluidity while the puddle is being built-up to the proper size; and to provide sufficient radiant and conductive heat to melt the welding rod to deposit molten metal. Although the lower or melting end of the welding rod extends into the puddle and usually receives the greatest amount of heat therefrom, it is desirable at times to heat portions of the rod above the puddle by direct and radiant heat of the flame so that such portions are preheated to insure the proper rate of melting of the welding rod. The rate of melting the welding rod should be such that it will coincide with the rate of the welding operation as a whole or the inherent rate of preparation for welding which a particular set of welding circumstances establishes.

The flame manipulation just mentioned makes it impossible to apply welding heat uniformly to the weld puddle, and, as a result, a certain amount of undesirable chilling and reheating of the weld puddle occurs during a welding operation. In certain instances molten metal is not deposited at a sufficiently rapid rate, in view of the flame manipulation required, and, consequently, there is a tendency on the part of the welder to depart from the recommended procedure and to concentrate the application of the flame to the task of rod melting to the detriment of efficient welding operation. It also frequently occurs that a welder lays the body of the inner or luminous cone of the flame onto the surface of the solid metal about the puddle when it is noticed that considerable heat is required at a particular region, and this is objectionable in that it disturbs the efficiency of an otherwise balanced welding operation. Considerable flame manipulation further decreases the optimum rate at which welds can be made, and also increases the gas consumption per pound of welding rod melted and deposited along a seam formed by base members to be united.

The object of this invention is to avoid to a considerable extent the above objections by providing an improved nozzle or tip with which welds can be produced with a minimum amount of flame manipulation. I accomplish this by providing a blowpipe nozzle or tip having a plurality of orifices for providing a main welding flame and a plurality of preheating flames.

This invention will be better understood from the following description taken in connection with the accompanying drawing, in which Fig. 1 is a longitudinal view, partly in section, of a nozzle or tip embodying this invention; Fig. 2 is a sectional view, taken at line 2—2 of Fig. 1; Fig. 3 is a longitudinal view, partly in section, of a nozzle or tip illustrating another embodiment of this invention; Fig. 4 is a sectional view, taken at line 4—4 of Fig. 3; Fig. 5 is a view of the nozzle shown in Fig. 1 forming part of a blowpipe which is illustrated in a welding position at a seam formed at the opposed edges of two pipe sections; and Fig. 6 is a sectional view, taken at line 6—6 of Fig. 5, to illustrate more clearly the manner in which the welding and preheating flames are applied to the contiguous edges of the pipe sections.

In order to reduce the amount of flame manipulation required in gas welding operations an improved welding nozzle 10, which is shown in Figs. 1 and 2, is provided for producing a main welding flame to supply heat primarily to the weld puddle and to the welding rod, and a plurality of supplementary preheating flames to supply heat to regions of the base metal slightly ahead of the weld puddle so they can be readily melted by the high temperature luminous cone of the welding flame.

The body of the nozzle or tip 10 is preferably of one-piece or unitary construction having a threaded reduced inner end 11 and a gradually tapered outer end 12. To provide a wrench grip for securing the nozzle 10 to a welding head or blowpipe, a nut 13 is formed integrally with the nozzle adjacent the threaded reduced end 11. The nozzle 10 is provided with a bore or main combustible gas passage 15 extending axially therethrough and having an inlet 16 at the reduced end 11 and an outlet at the outer end forming a discharge orifice 17 at which the main welding flame is produced.

The gas passage 15, intermediate its inlet and outlet, converges rather sharply at 18 for a short distance so that a portion of the wall of the passage is in the path of flow of the gas mixture forced through the passage. From the converging portion 18 the gas passage 15 is elongated and tapers gradually toward the discharge orifice 17. Thus at least a part of the tip is of diminishing cross section from the rear of the front thereof, and at the extreme outer end it is substantially uniform in cross-sectional area for a short distance.

At the relatively sharp converging portion 18 two additional gas passages 19, of smaller cross-sectional area than the passage 15, extend at an acute angle of about 60° to the longitudinal axis of the passage 15 in a direction toward the discharge orifice 17. These gas passages provide supplementary preheating flames, are in the same plane and substantially parallel to each other, are of equal length, and terminate in discharge orifices at the flat surface 20 of a protuberance 21 formed on the nozzle 10 intermediate the ends thereof. It will be apparent that these discharge orifices are disposed a substantial distance behind the main discharge orifice 17. The gradually tapering portion of the gas passage 15 provides a hard blowing welding flame which is particularly desirable in certain welding operations.

In Figs. 3 and 4 another embodiment of this invention is shown in which a relatively soft main welding flame is produced, such a flame being desirable in certain instances. The welding nozzle 10' illustrated in Figs. 3 and 4 is similar to that shown in Figs. 1 and 2, with similar parts indicated by the same reference numerals. Instead of providing a main gas passage having a gradually tapering outer end, the gas passage 15' in the nozzle shown in Figs. 3 and 4 is of uniform cross-sectional area for a considerable distance from the sharply converging portion 18 toward the discharge orifice 17. The main gas passage 15' then tapers gradually to the portion of uniform cross-sectional area at the extreme outer end of the tip. Although the preheating gas passages 19 are shown substantially parallel to each other in Fig. 2, these gas passages may mutually converge or diverge, such diverging gas passages being indicated at 19' in Fig. 4 to provide diverging supplementary preheating flames.

One application of the nozzles just described is shown in Figs. 5 and 6 for manually welding the contiguous edges of plates or other structural members, the figures illustrating the beveled ends of pipe sections 22 and 23 opposed to each other and maintained in such position in any suitable manner, as by tack welding. The nozzle 10 may be secured to the other end of a stem 24 of a blowpipe B, the inner end of which may be secured to a handle 25 provided with valve adjusting screws 26 and 27 for controlling the supply of oxygen and a combustible gas, such as acetylene, to provide the gas mixture in the usual manner.

The blowpipe B is preferably held in such a position that the nozzle 10 is substantially in the vertical plane of the seam formed at the opposed edges of pipe sections 22 and 23 and at an acute angle to the surface of the seam at the point of welding, the welding flame being directed toward a welded portion 28 of the seam. The welding rod 29 is held by the welder at an acute angle to the surface of the seam and is inclined toward the nozzle 10 with the lower end thereof extending into the weld puddle P.

During welding, heat is supplied to the puddle P by the main welding flame, the inner or luminous cone 30 of which licks and/or almost touches the molten metal while the outer envelop 31 thereof embraces the region of deposition of weld metal. The portion of the welding rod in the puddle receives heat by conduction from the puddle while the portion thereof above the puddle is heated by radiant heat of the puddle and both by direct and radiant heat of the main welding flame.

Slightly ahead of the puddle P unwelded portions of the seam are heated by the two supplementary preheating flames 32 and 33, these flames being applied to the base metal of the contiguous edges of the pipe sections in substantially the same transverse plane to preheat such metal for its subsequent melting preparatory to receiving deposited metal. Since the base metal at the region ahead of the weld puddle is always effectively preheated by the flames 32 and 33, the amount of crosswise and circular movement of the main welding flame and welding rod 29 is considerably reduced. Further, the heat of the main welding flame can be directed more on the puddle P and the welding rod and less toward the region of the base metal ahead of the puddle.

In welding with the multi-flame nozzle, the motion of the nozzle for the greater part is a slight forward and backward motion along the seam being welded. A similar motion, greatly reduced as compared with the movement imparted to the nozzle, is also given to the welding rod, the movement of the rod being confined to the puddle area. When the blowpipe is correctly manipulated, the preheating flames effectively preheat metal ahead of the advancing liquid puddle, and the contiguous edges of the base metal immediately ahead of the puddle are continuously melted to insure complete fusion and penetration of the added weld metal.

The above-described method of welding is termed the "backhand" method because the welding flame is directed at an acute angle toward the welded portion of the seam and moved backwards toward unwelded portions of the seam, as indicated by the arrow C in Fig. 5. Although substantially "neutral" flames may be employed, it is preferred to so adjust the mixture of oxygen and acetylene that slightly "excess acetylene" flames are produced. Such excess acetylene flames tend to carburize the base metal surfaces ahead of the advancing puddle in that these surfaces, upon reaching a white hot temperature, absorb carbon from the excess acetylene flames. The absorption of carbon by the base metal lowers its melting point so that the surfaces are melted at a lower temperature than when a "neutral" flame is employed, thus effecting an economy in gas consumption and increasing the rate of welding. In addition, the carbon absorbed in the surface metal tends to reduce the ordinary surface oxide to a form of steel which unites readily with the molten metal deposited. The method of gas welding just described, in which an excess acetylene flame is preferably used, is disclosed and claimed in U. S. Letters Patent No. 1,973,341, granted on an application of Harry S. George.

In producing welds it is of considerable importance that a welder continuously observe the puddle and region of base metal ahead of the puddle to make certain that fusion is taking place without excessive melting of the base metal. For this reason the outer end of the stem 24 of the blowpipe B is bent at an obtuse angle of about 120° so that, when the nozzle is substantially in the vertical plane of the seam, the handle 25 is conveniently positioned for the welder. With this blowpipe construction, a welder can position himself at one side of the seam and readily observe the welding progress to accurately manipulate the blowpipe and feed the welding rod.

When the nozzle 10 or 10' is employed for back-hand welding, as just described, the force of the main welding flame tends to restrain the forward flow of molten metal from the bottom of the root of the V, thus maintaining the puddle in its proper position.

In view of the foregoing, it will be seen that less flame manipulation is necessary when a multi-flame nozzle is employed in welding plates and other structural shapes. This reduces considerably undesirable chilling and subsequent reheating of the weld puddle, so that welds of better quality are produced. With less stirring of the weld puddle, the formation of ordinary surface oxide is also reduced.

While particular embodiments of the present invention are shown it will be apparent to those skilled in the art that modifications may be made without departing from the spirit and scope of the invention.

What is claimed is:

1. A welding nozzle adapted to be secured to a blowpipe or welding head, said nozzle comprising a one-piece body having a bore extending axially through said body and terminating in a single main welding jet discharge orifice coaxial with said bore, said body also having a pair of parallel coplanar gas outlet passages communicating with said bore and extending through the wall thereof at an acute angle to the axis of said bore, each of said passages being inclined toward said main orifice and having a preheating jet discharge orifice of smaller diameter than the diameter of said single main orifice, said pair of passages having their discharge orifices disposed at a substantial distance behind said main orifice.

2. A welding nozzle adapted to be secured to a blowpipe or welding head, said nozzle comprising a one-piece body having a bore extending axially through said body and terminating in a single main welding jet discharge orifice coaxial with said bore, said body also having a pair of gas outlet passages communicating with said bore and extending through the wall thereof at an acute angle to the axis of said bore, each of said passages being inclined toward said main orifice and having a preheating jet discharge orifice of smaller diameter than the diameter of said single main orifice, said pair of passages having their discharge orifices disposed at a substantial distance behind said main orifice.

3. A welding nozzle adapted to be secured to a blowpipe or welding head, said nozzle comprising a one-piece body having a bore extending axially through said body and terminating in a single main welding jet discharge orifice coaxial with said bore, said body also having a pair of gas outlet passages communicating with said bore and extending through the wall thereof at an acute angle to the axis of said bore, each of said passages being inclined toward said main orifice and having a preheating jet discharge orifice of smaller diameter than the diameter of said single main orifice, the exterior wall of said bore having a protuberance integral with said body at a substantial distance behind the main orifice, and said pair of passages extending through said protuberance.

4. A welding nozzle adapted to be secured to a blowpipe or welding head, said nozzle comprising a one-piece body having a bore extending axially through said body and terminating in a single main welding jet discharge orifice coaxial with said bore; said body also having a pair of gas outlet passages of substantially the same length disposed in the same plane communicating directly with said bore and extending through the wall thereof at an angle to the axis of said bore, each of said passages having a preheating jet discharge orifice of smaller diameter than said single main orifice, the discharge orifices of said pair of passages being located a substantial distance behind said main discharge orifice, and said bore having an elongated tapering portion between said main orifice and the entrances of said pair of passages.

FRANK C. HUTCHISON.